No. 828,316. PATENTED AUG. 14, 1906.
G. H. HULETT.
SHIP LOADING APPARATUS.
APPLICATION FILED JUNE 23, 1904.
6 SHEETS—SHEET 1.
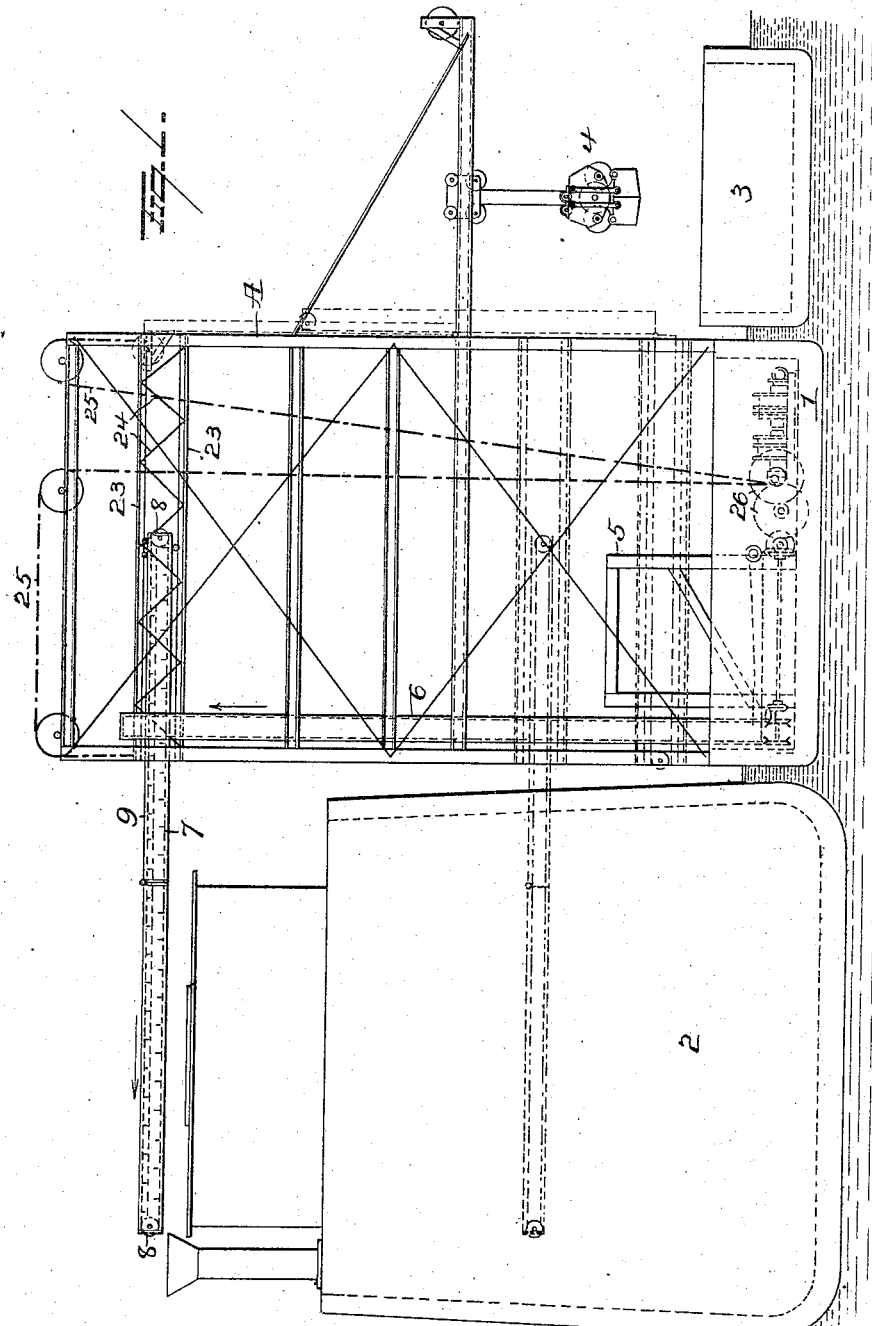
WITNESSES
E. D. Nottingham
G. F. Downing
INVENTOR
G. H. Hulett
By H. A. Seymour
Attorney

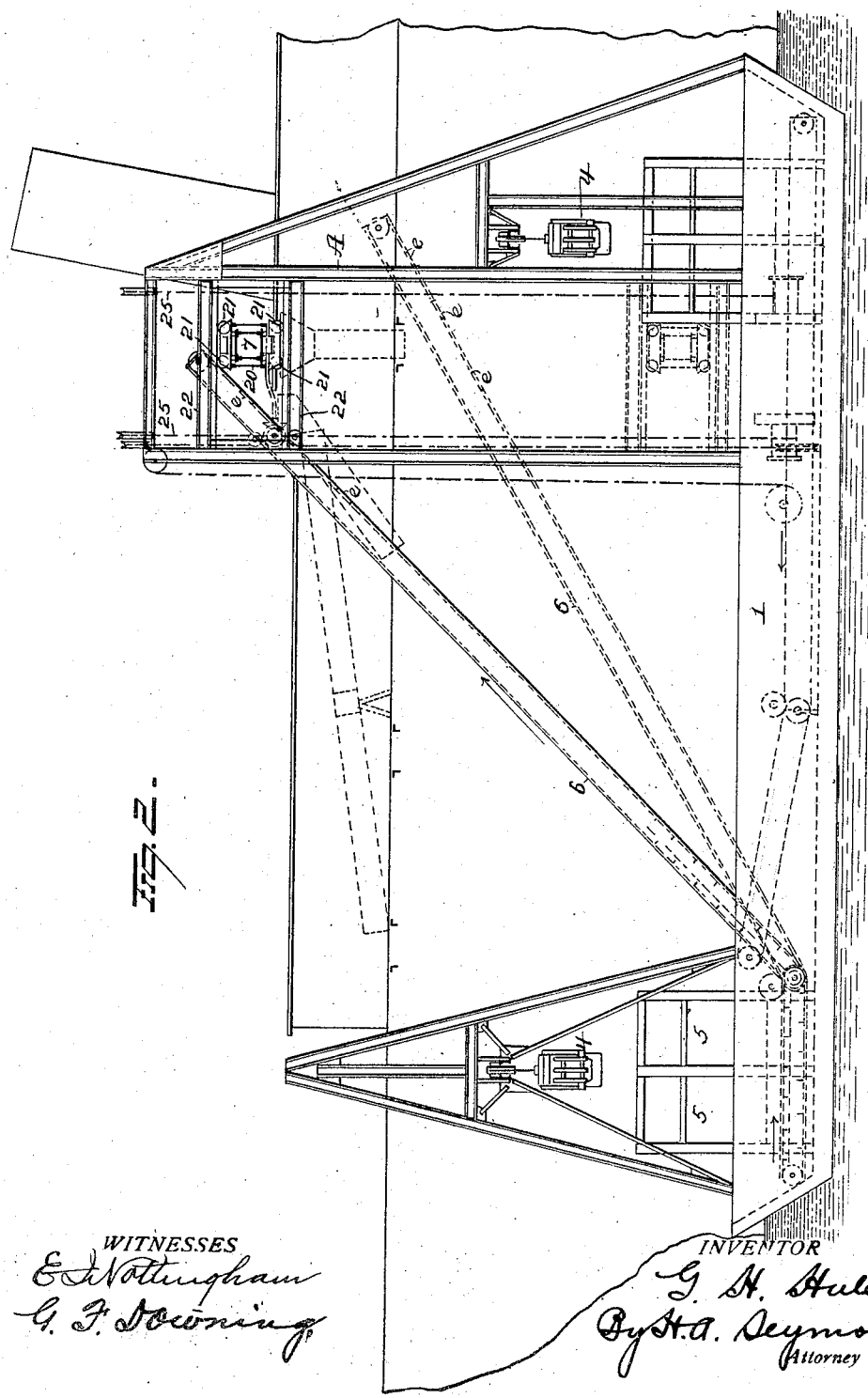

No. 828,316. PATENTED AUG. 14, 1906.
G. H. HULETT.
SHIP LOADING APPARATUS.
APPLICATION FILED JUNE 23, 1904.
6 SHEETS—SHEET 3.
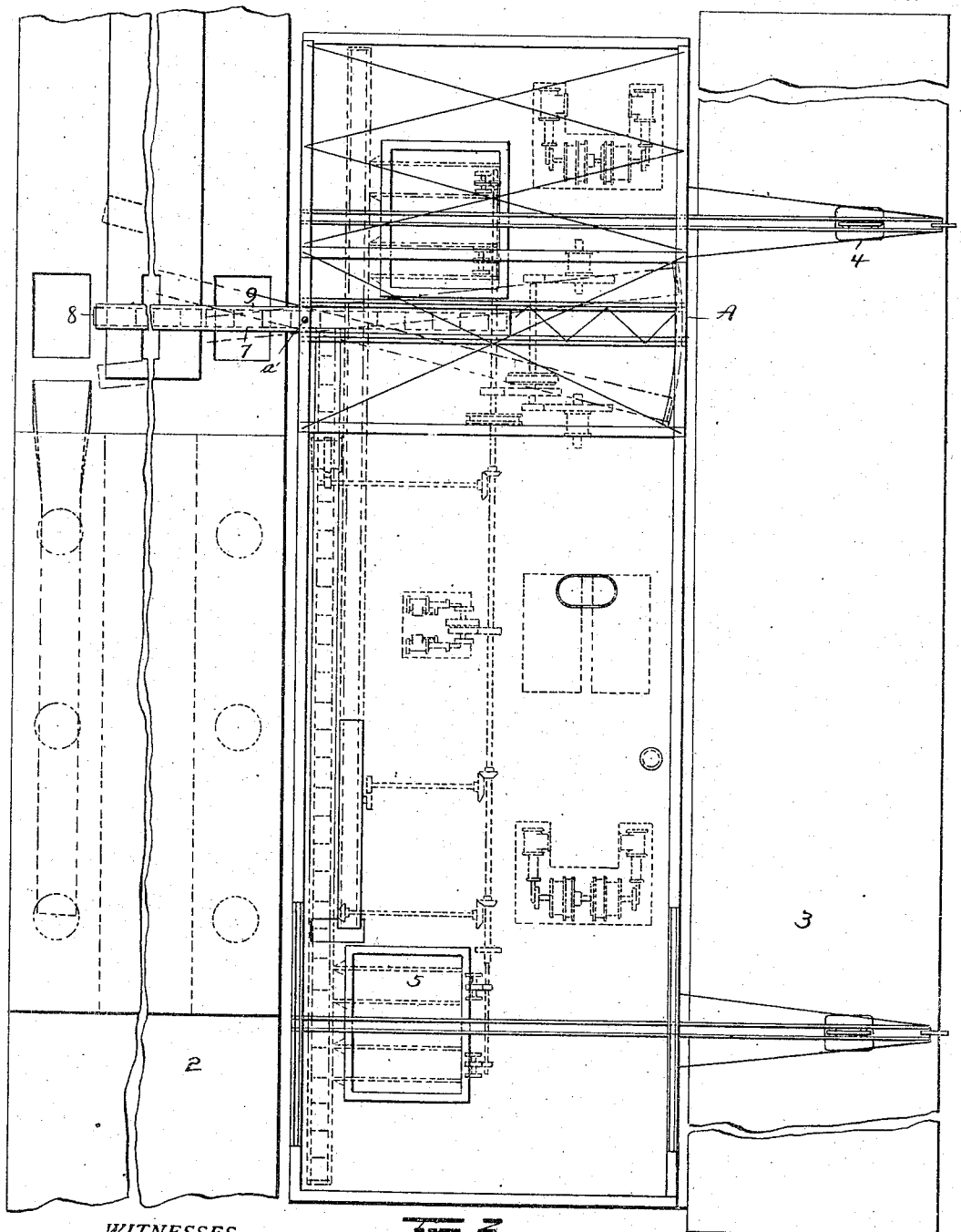
WITNESSES
INVENTOR

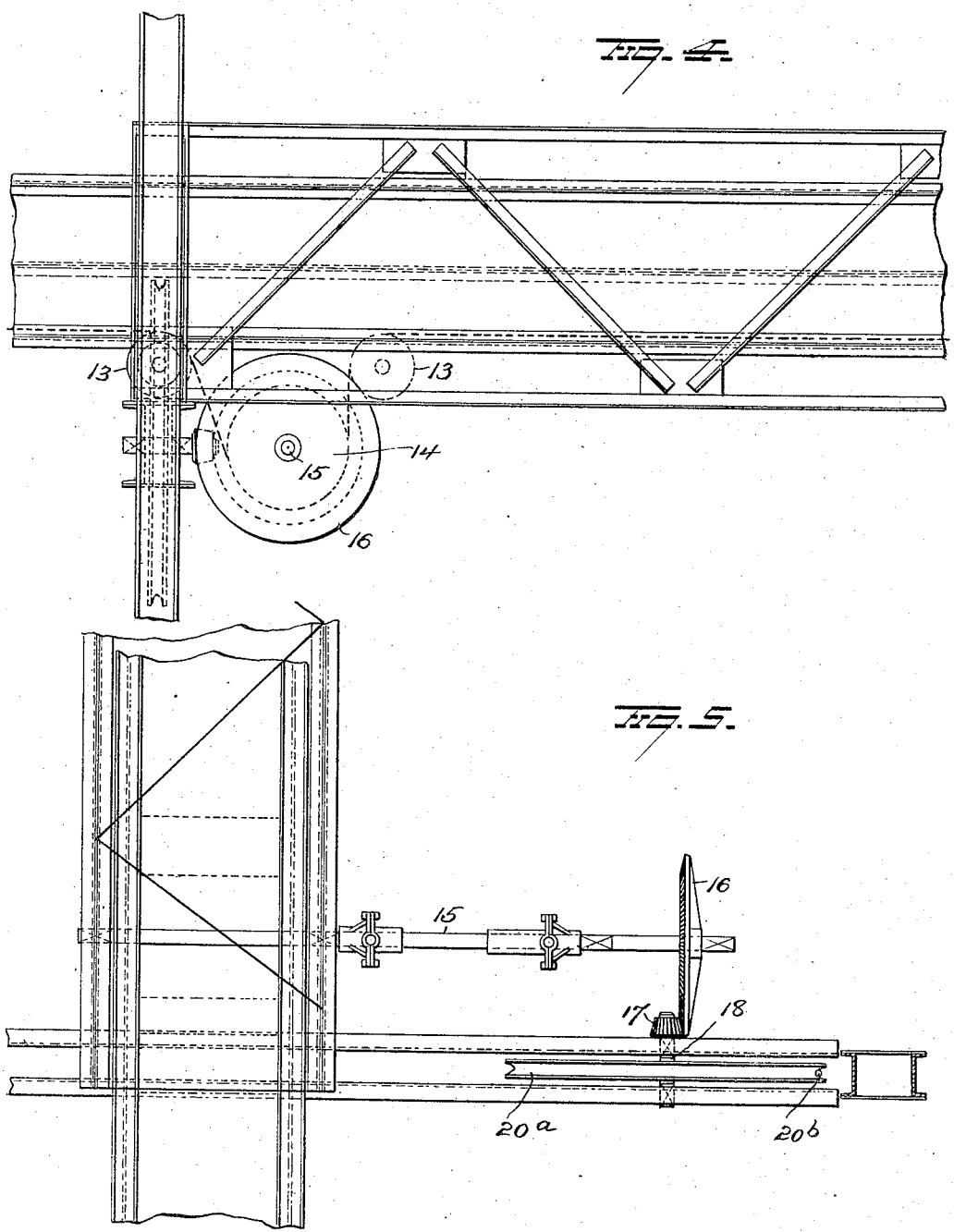

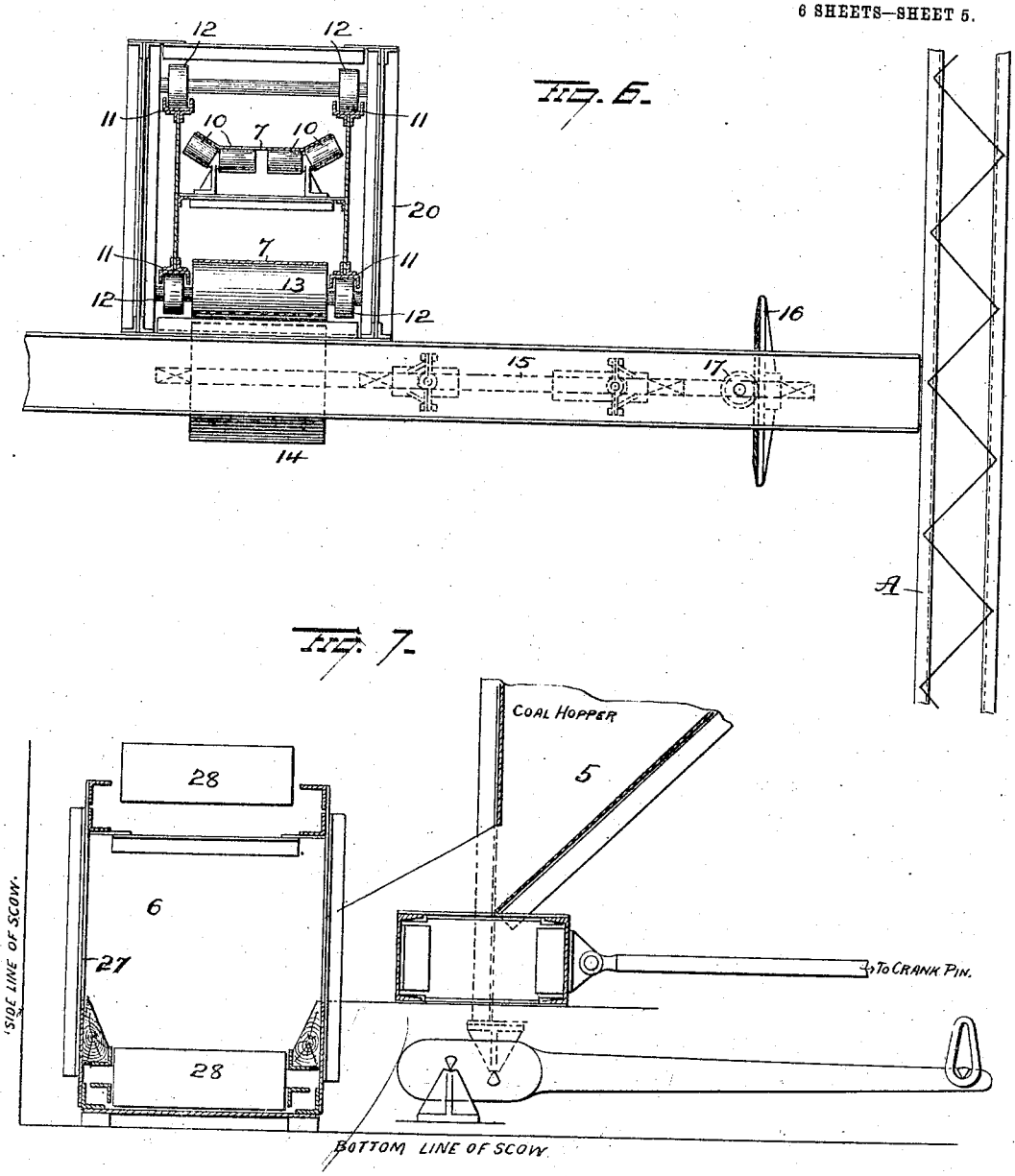

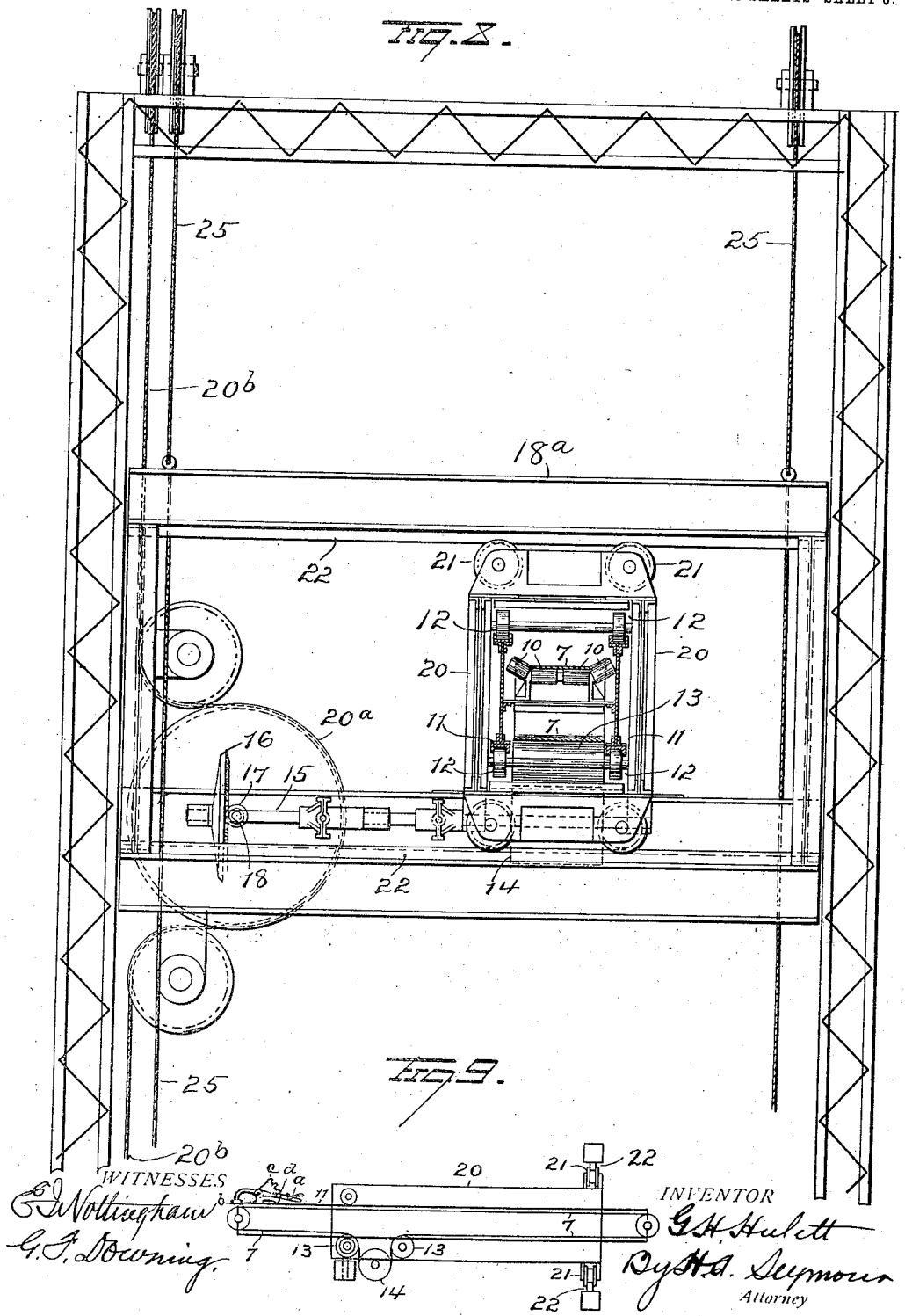

UNITED STATES PATENT OFFICE.

GEORGE H. HULETT, OF CLEVELAND, OHIO, ASSIGNOR TO THE WELLMAN-SEAVER-MORGAN COMPANY, OF CLEVELAND, OHIO.

SHIP-LOADING APPARATUS.

No. 828,316.  Specification of Letters Patent.  Patented Aug. 14, 1906.

Application filed June 23, 1904. Serial No. 213,837.

*To all whom it may concern:*

Be it known that I, GEORGE H. HULETT, a resident of Cleveland, in the county of Cuyahoga and State of Ohio, have invented certain new and useful Improvements in Ship-Loading Apparatus; and I do hereby declare the following to be a full, clear, and exact description of the invention, such as will enable others skilled in the art to which it appertains to make and use the same.

My invention relates to an improved ship-loading apparatus, and more particularly to a fueling apparatus for steamships, the object of the invention being to provide improvements of this character having a continuous horizontal conveyer capable of longitudinal and vertical adjustment to enable the conveyer to be placed in position to direct coal, ore, or other material into any part of a ship without interference with rigging, spars, funnels and other parts of the ship above deck; and the invention consists in certain novel features of construction and combinations and arrangements of parts, as will be more fully hereinafter described, and pointed out in the claims.

In the accompanying drawings, Figure 1 is a view in elevation illustrating my improvements. Fig. 2 is a view in elevation taken at right angles to Fig. 1. Fig. 3 is a top plan view. Fig. 4 is an enlarged fragmentary view in side elevation of the dumping conveyer and frame therefor. Fig. 5 is a top plan view of Fig. 4. Fig. 6 is a view in cross-section of Fig. 5, and Fig. 7 is an enlarged view in cross-section of the inclined conveyer and hopper for directing material thereinto. Fig. 8 is a view showing the vertically-movable frame 18$^a$, the carriage 20, conveyer 7, and means for operating the same. Fig. 9 is a diagrammatical view showing the conveyer 7, conveyer-frame, and carriage 20.

1 represents a boat or float, on which my improvements are mounted, or the same may be upon a dock or other fixed support, and I do not wish to restrict myself to the boat or float carried loading apparatus, but consider myself at liberty to mount the same upon any suitable support.

2 represents a steamship beside the float 1 to receive fuel or other material therefrom, which is taken from a loaded barge 3 beside float 1 or from a pile beside or on the dock or from any other source of supply.

An open framework A is provided on float 1 and is constructed to support an ordinary excavating-bucket 4 to remove the fuel or other material from barge 3 and deposit it into a hopper 5 on float 2, and said hopper is adapted to direct the material into an inclined conveyer 6 for carrying the same up to and depositing it onto my improved adjustable horizontal conveyer 7, as will be more fully hereinafter explained.

The conveyer 7 comprises an endless belt, mounted to run on rollers 8 at the end of a frame 9, and said conveyer is supported at intermediate points by idle rollers 10, arranged in the formation shown to give to the upper member of the conveyer a trough-like shape to more effectually hold material deposited thereon. The frame 9 is provided at its upper and lower edges with channel-iron bars 11 to run on rollers 12, supported in a carriage 20, and facilitate the inward and outward movement of the conveyer-frame and conveyer. The carriage is pivoted at $a'$ in a vertically-movable frame 18$^a$, and said carriage is provided with wheels 21 to run on trackways 22, secured to the frame 18$^a$.

The conveyer-belt between the ends of its lower member passes over two idle rollers 13 and down below a drive-roller 14, secured on a flexible shaft 15, having a beveled gear 16 thereon, to which motion is transmitted by a beveled pinion 17 on a shaft 18, supported in the vertically-movable frame 18$^a$ and having a grooved pulley 20$^a$ thereon, to which motion in transmitted by a rope or cable-strap 20$^b$, on which the pulley has free adjustment up and down.

When it is desired to move the conveyer 7 inward or outward, the conveyer-belt is locked to either of the rollers 8 in any approved manner and drive-roller 14 turned in the proper direction, thereby drawing the conveyer-frame into the carriage 20 and main frame A or projecting it outward over or into the ship, as the case may be. One way in which the conveyer 7 can be locked to one of the rollers 8 to cause the operation of the conveyer 7 to move the conveyer-frame longitudinally is shown in Fig. 9. A lever $a$ is pivoted to the frame 9 of conveyer 7 and carries a brake-shoe gage the conveyer and clamp it to the roller at the end of the conveyer-frame. A segment c is provided to be engaged by a dog d on the lever to hold the brake-shoe against the conveyer and prevent it moving over the roller. When the conveyer is thus locked or clamped to the roller on the conveyer-frame and the driving mechanism of the conveyer is operated, the conveyer-frame will be made to move longitudinally as the conveyer is prevented from moving over the roller on said frame.

The vertically-movable frame 18ª is supported by cables 25, passed over sheaves at the top of main frame A, thence down over drums 26 in the bottom of float 1 and controlled by any approved form of motor, which permits the frame carrying the carriage and conveyer to be raised and lowered to any height desired to exactly position the conveyor 7 to direct the material into the hold of a ship.

The conveyer 6, above referred to, comprises a rectangular casing 27, extending beneath the hopper 5 and hinged between its ends and provided with suitable mechanism, such as a cable or gearing properly connected with the hinged portion of the conveyer-casing, to raise and lower the hinged end or portion of the casing to exactly position the same over the conveyer 7 regardless of the adjustment of the latter, and in said casing is a scraper-chain construction 28, movable around suitable rollers at the ends of the conveyer-casing and adapted to draw the material deposited in the casing by the hopper up through the casing to a discharge-opening e therein over conveyer 7, and a series of these openings e are provided having closures to permit any one to be opened as may be necessary to discharge the material onto conveyer 7.

Other mechanism may be provided for delivering the material onto conveyer 7, and a great many changes and alterations might be made in the general form and arrangement of parts described without departing from my invention. Hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a loading apparatus, the combination with framework, of a carriage movable horizontally in said framework, a horizontal endless conveyer having its frame movable through the carriage at right angles to the line of travel of the latter, and driving means coöperating with said endless conveyer to operate the same or move it bodily endwise.

2. In a loading apparatus, the combination with a supporting-frame, of a continuous horizontal conveyer thereon, means for adjusting the same longitudinally and vertically, a hopper, and conveyer receiving material from the hopper and depositing it on the horizontal conveyer at any adjustment of the latter.

3. In a loading apparatus, the combination with a supporting-frame, of a horizontal conveyer-frame mounted to move longitudinally thereon, a belt conveyer on the conveyer-frame turning over rollers at the ends of the conveyer-frame, a drive-roller for said belt and adapted to move the conveyer-frame and conveyer longitudinally when the belt is locked to either of the end rollers and the drive-roller is turned.

4. In a loading apparatus, the combination with a supporting-frame, of a vertically-movable frame supported thereon, and a longitudinally-movable horizontal conveyer on said vertically-movable frame.

5. In a loading apparatus, the combination with a supporting-frame, of a vertically-movable frame supported thereon, a laterally-movable carriage on said vertically-movable frame, and a continuous horizontal conveyer mounted to be adjusted longitudinally in said carriage.

6. In a loading apparatus, the combination with a supporting-frame, of a vertically-movable frame supported thereon, means for adjusting said last-mentioned frame vertically, a laterally-movable carriage on said vertically-movable frame, a longitudinally-adjustable horizontal conveyer supported by said carriage, a hopper, and a conveyer adapted to receive material from the hopper and carry it to the horizontal conveyer.

7. In a ship fueling or loading apparatus, the combination with a float adapted to be located beside the ship, a supporting-frame on said float, a horizontal conveyer on said frame, means for adjusting the conveyer longitudinally and vertically, and means for taking fuel or material from a barge beside the float and depositing it onto said conveyer.

8. In a loading apparatus, the combination with a supporting-frame, of a horizontal conveyer-frame having longitudinal movement on said supporting-frame, a belt conveyer movable around rollers at the ends of the conveyer-frame, a drive-roller below the horizontal plane of the lower belt-section and around which the belt is passed, idle rollers on opposite sides of the drive-roller in a horizontal plane above the same, and said drive-roller adapted, when the belt is locked to either of the end rollers, to move the conveyer longitudinally, when the drive-roller is turned.

9. In a loading apparatus, the combination with a supporting-frame, of a vertically-movable frame thereon, a horizontal conveyer-frame having roller-mounting supporting the same on the vertically-movable frame, a belt conveyer on said conveyer-frame, means for driving said belt and adjusting the conveyer longitudinally, and means for depositing material onto said conveyer.

In testimony whereof I have signed this specification in the presence of two subscribing witnesses.

GEORGE H. HULETT.

Witnesses:
C. W. COMSTOCK,
A. MAY CARLIN.